United States Patent
Lee et al.

(10) Patent No.: US 11,676,762 B2
(45) Date of Patent: Jun. 13, 2023

(54) MULTILAYER CAPACITOR

(71) Applicant: SAMSUNG ELECTRO-MECHANICS CO., LTD., Suwon-si (KR)

(72) Inventors: Jang Yeol Lee, Suwon-si (KR); Hye Min Bang, Suwon-si (KR); Bum Soo Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 25 days.

(21) Appl. No.: 17/235,350

(22) Filed: Apr. 20, 2021

(65) Prior Publication Data

US 2022/0172895 A1 Jun. 2, 2022

(30) Foreign Application Priority Data

Nov. 27, 2020 (KR) .......................... 10-2020-0162566

(51) Int. Cl.
*H01G 4/12* (2006.01)
*H01G 4/008* (2006.01)
*H01G 4/012* (2006.01)
*H01G 4/30* (2006.01)

(52) U.S. Cl.
CPC ........... *H01G 4/1209* (2013.01); *H01G 4/008* (2013.01); *H01G 4/012* (2013.01); *H01G 4/30* (2013.01)

(58) Field of Classification Search
CPC ...... H01G 4/232; H01G 4/1209; H01G 4/008; H01G 4/012; H01G 4/30

USPC .......... 361/301.4, 321.1, 321.2, 321.3, 306.3
See application file for complete search history.

(56) References Cited

U.S. PATENT DOCUMENTS

| | | | |
|---|---|---|---|
| 6,232,867 B1 * | 5/2001 | Yoshida | H01C 7/102 338/21 |
| 7,075,405 B2 * | 7/2006 | Takehana | H01C 1/148 338/21 |
| 2013/0250480 A1 | 9/2013 | Ahn et al. | |
| 2016/0172108 A1 * | 6/2016 | Ikeda | H01G 4/2325 361/301.4 |
| 2018/0082786 A1 | 3/2018 | Asano et al. | |

(Continued)

FOREIGN PATENT DOCUMENTS

| | | |
|---|---|---|
| JP | 2000-164406 A | 6/2000 |
| JP | 2008-251630 A | 10/2008 |

(Continued)

*Primary Examiner* — Arun Ramaswamy
(74) *Attorney, Agent, or Firm* — Morgan, Lewis & Bockius LLP (57) ABSTRACT

A multilayer capacitor includes a body including a stack structure in which dielectric layers are stacked and internal electrodes are stacked with one of the dielectric layers interposed therebetween and first and second external electrodes disposed on the body and connected to the first and second internal electrodes, respectively. The first external electrode includes a first electrode layer covering a first surface of the body to which the first internal electrode is exposed, a glass layer covering the first electrode layer and a second surface of the body connected to the first surface, and a second electrode layer covering the glass layer, and the glass layer includes an inner region having a discontinuous region and an outer region covering the second surface of the body and having an end exposed from the second electrode layer.

20 Claims, 7 Drawing Sheets

(56) References Cited

U.S. PATENT DOCUMENTS

| | | | |
|---|---|---|---|
| 2018/0090271 A1* | 3/2018 | Ito | H01G 4/1209 |
| 2019/0157006 A1* | 5/2019 | Han | H01G 4/008 |
| 2020/0118747 A1* | 4/2020 | Muramatsu | H01G 4/012 |

FOREIGN PATENT DOCUMENTS

| | | | | |
|---|---|---|---|---|
| JP | 5440309 B2 | 3/2014 | | |
| KR | 10-2013-0106568 A | 9/2013 | | |
| KR | 10-2018-0031567 A | 3/2018 | | |
| WO | WO-2014199752 A1 * | 12/2014 | | C25D 5/12 |

* cited by examiner

MULTILAYER CAPACITOR

CROSS-REFERENCE TO RELATED APPLICATION

This application claims benefit of priority to Korean Patent Application No. 10-2020-0162566 filed on Nov. 27, 2020 in the Korean Intellectual Property Office, the disclosure of which is incorporated herein by reference in its entirety.

TECHNICAL FIELD

The present disclosure relates to a multilayer capacitor.

BACKGROUND

A capacitor is an element capable of storing electricity. Generally, a principle in which two electrodes are opposed to each other and electricity is accumulated in each electrode when a voltage is applied thereto is used. When a direct current (DC) voltage is applied, electricity is accumulated and current flows in the capacitor, but when accumulation is completed, no current flows in the capacitor. On the other hand, when an alternating current (AC) voltage is applied, AC current continues to flow, while polarities of the electrodes are alternately changed.

According to types of an insulator provided between electrodes, capacitors are classified as an aluminum electrolytic capacitor in which aluminum electrodes are configured and a thin oxide film is provided between the aluminum electrodes, a tantalum capacitor using tantalum as an electrode material, a ceramic capacitor using a high-k dielectric material such as barium titanate between electrodes, a multilayer ceramic capacitor (MLCC) in which high-k ceramics having a multilayer structure is used as a dielectric material provided between electrodes, a film capacitor using a polystyrene film as a dielectric material between electrodes, and the like.

The MLCCs, among the capacitors, which advantageously have excellent temperature and frequency characteristics and may be realized in a small size, have recently been commonly applied in various fields such as high frequency circuits. In recent years, attempts to implement a smaller multilayer ceramic capacitor continue, and to this end, a dielectric layer and an internal electrode are formed to be thin.

Recently, in the field of multilayer capacitors, many attempts have been made to improve moisture resistance by reducing defects due to penetration of moisture or plating solutions. As a method, when a cover layer of a capacitor body or external electrodes are formed to be thick, there is a problem that a size of the component increases and capacitance decreases with the same size.

SUMMARY

An aspect of the present disclosure may provide a multilayer capacitor having improved moisture resistance reliability.

According to an aspect of the present disclosure, a multilayer capacitor may include: a body including a stack structure in which dielectric layers are stacked and first and second internal electrodes are stacked with one of the dielectric layers interposed therebetween; and first and second external electrodes disposed on the body and connected to the first internal electrodes. The first external electrode include a first electrode layer covering a first surface of the body to which the first internal electrode is exposed, a glass layer covering the first electrode layer and a second surface of the body connected to the first surface, and a second electrode layer covering the glass layer, and the glass layer includes an inner region having a discontinuous region and an outer region covering the second surface of the body and having an end exposed from the second electrode layer.

The outer region may be thicker than the inner region.

A least a portion of the discontinuous region may be filled with at least one of the first and second electrode layers so that the first and second electrode layers are connected to each other.

The first and second electrode layers may include the same material.

The first and second electrode layers may include at least one of Cu and Ni.

The first and second electrode layers may include glass having the same component as that included in the glass layer.

The outer region may expose a portion of the second surface of the body.

The outer region of the glass layer included in the first external electrode and an outer region of a glass layer included in the second external electrode may be spaced apart from each other.

A region of the inner region of the glass layer covering the second surface of the body may be thicker than a region covering the first surface of the body.

A thickness of the outer region of the glass layer may be 0.5 μm or more.

A thickness of the inner region of the glass layer may be 0.2 μm or more.

A region of the inner region of the glass layer covering the second surface of the body may be in contact with the body.

The first electrode layer may not cover the second surface of the body.

A portion of the inner region may decrease in thickness in an inward direction from a region connected to the outer region.

A surface of the inner region may have a random shape.

A surface of the outer region may have a random shape.

The second surface of the body may be perpendicular to a direction in which the first and second internal electrodes are stacked.

A portion of a side surface of an end of the second electrode layer may be covered by the outer region.

The first external electrode may further include a plating layer, and the outer region covering the second surface of the body may have the end exposed from the plating layer.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
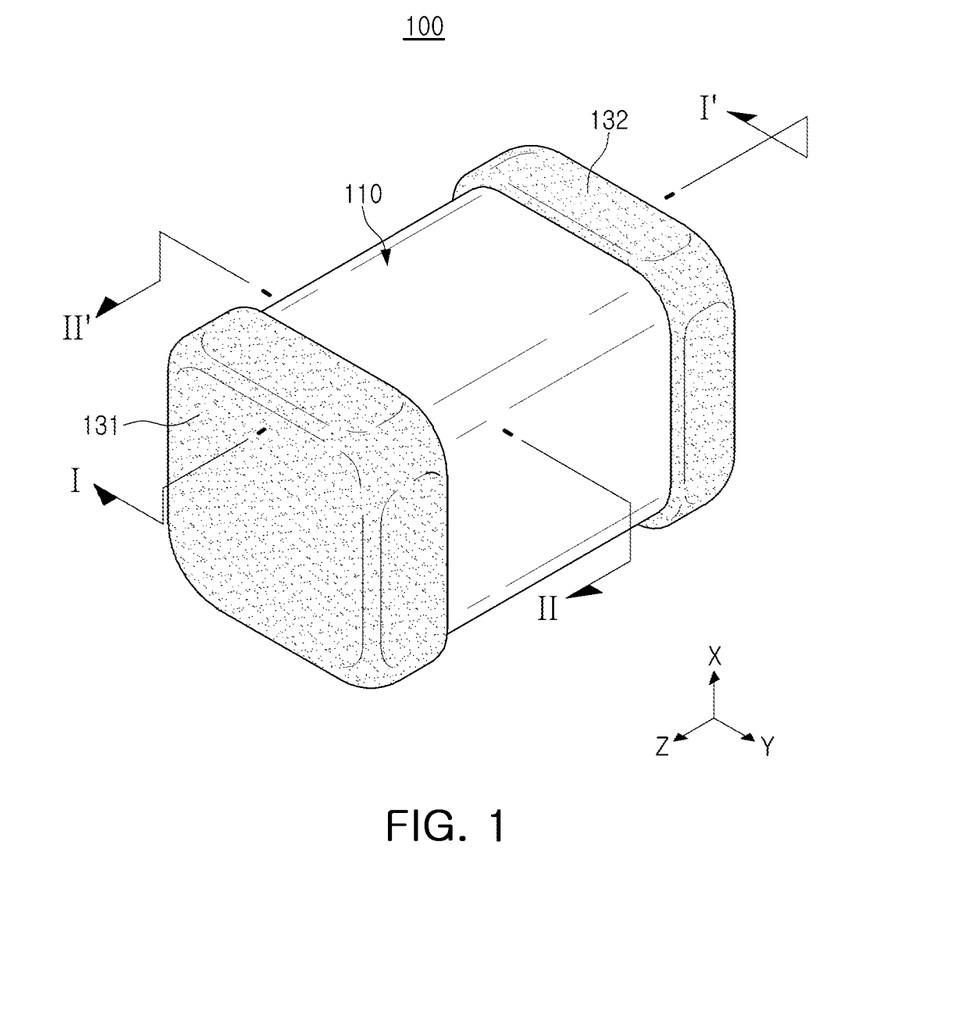
FIG. 1 is a perspective view schematically showing an appearance of a multilayer capacitor according to an exemplary embodiment in the present disclosure.
Figure 2:
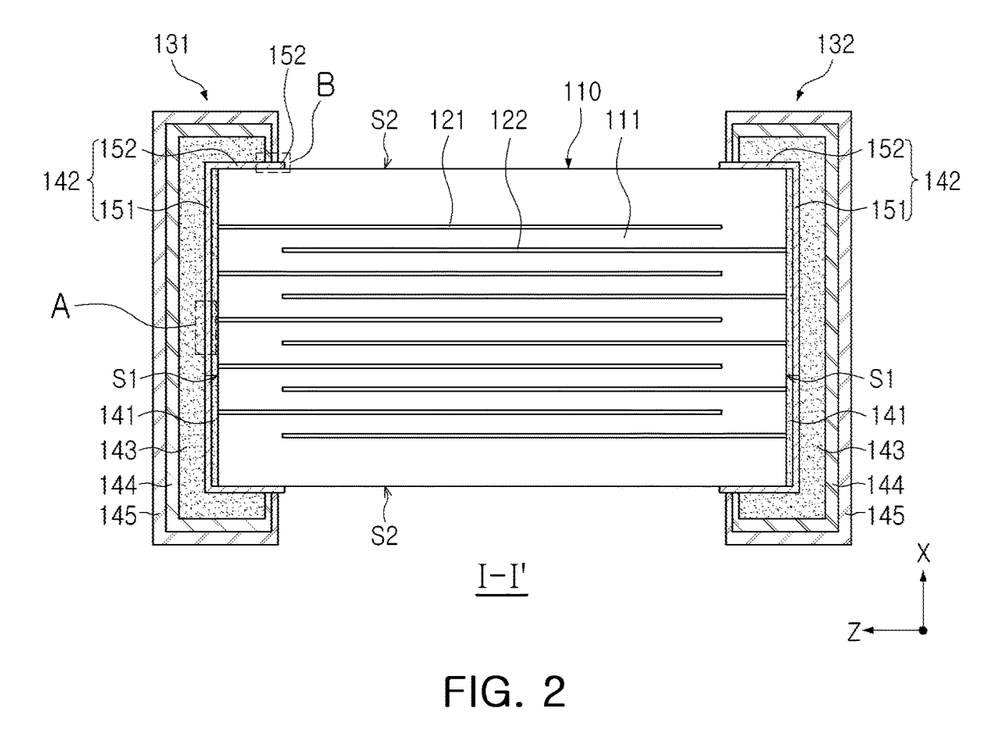
FIG. 2 is a cross-sectional view of the multilayer capacitor of FIG. 1, taken along line I-I'.
Figure 3:
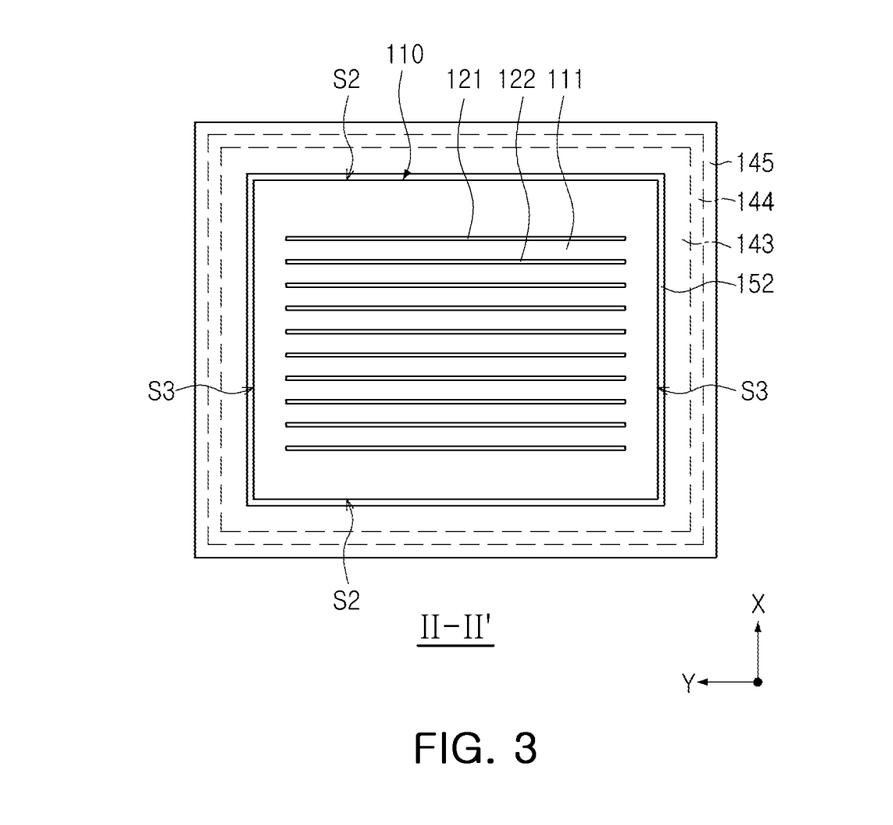
FIG. 3 is a cross-sectional view of the multilayer capacitor of FIG. 1, taken along line II-II'.

FIG. 1 is a perspective view schematically showing an appearance of a multilayer capacitor according to an exemplary embodiment in the present disclosure. FIG. 2 is a cross-sectional view of the multilayer capacitor of FIG. 1, taken along line I-I'. FIG. 3 is a cross-sectional view of the multilayer capacitor of FIG. 1, taken along line II-II'. FIGS. 4 through 9 are enlarged views of a partial region of FIG. 2.

Referring to FIGS. 1 through 4 together, a multilayer capacitor 100 according to an exemplary embodiment in the present disclosure includes a body 110 including a dielectric layer 111 and a plurality of internal electrodes 121 and 122 stacked with the dielectric layer 111 interposed therebetween and external electrodes 131 and 132, and the external electrodes 131 and 132 include a glass layer 142. Here, the glass layer may prevent the intrusion of moisture or a plating solution from the outside and includes an inner region 151 having a discontinuous region D and an outer region 152 having an end exposed from a second electrode layer 143. In one example, a portion of the outer region 152 may be exposed from additional electrode layers 144 and 145.

The body 110 includes a plurality of dielectric layers 111 and may be obtained, for example, by stacking a plurality of green sheets and then sintering the stacked green sheets. Through the sintering process, the plurality of dielectric layers 111 may have an integrated form. As shown in FIG. 1, the body 110 may have a shape similar to a rectangular parallelepiped. The dielectric layer 111 included in the body 110 may include a ceramic material having a high dielectric constant, for example, BT-based, i.e., a barium titanate ($BaTiO_3$)-based ceramic. However, other materials known in the art may be used as long as sufficient capacitance may be obtained. The dielectric layer 111 may further include additives, organic solvents, plasticizers, binders, and dispersants, if necessary, along with such a ceramic material as a main component. Here, in the case of additives, additives may be added in the form of metal oxides during a manufacturing process. An example of such a metal oxide additive may include at least one of $MnO_2$, $Dy_2O_3$, BaO, MgO, $Al_2O_3$, $SiO_2$, $Cr_2O_3$, and $CaCO_3$.

The plurality of internal electrodes 121 and 122 may be obtained by printing a paste containing a conductive metal with a predetermined thickness on one surface of the ceramic green sheet and then sintering the paste. In this case, the plurality of internal electrodes 121 and 122 may include first and second internal electrodes 121 and 122 exposed in directions of the body 110 opposite to each other (a Z direction in the drawings) and a surface of the body 110 to which the first and second internal electrodes 121 and 122 are exposed will be defined as a first surface S1. The first and second internal electrodes 121 and 122 are connected to different external electrodes 131 and 132 to have different polarities when driven, and may be electrically separated from each other by the dielectric layer 111 disposed therebetween. However, the number of the external electrodes 131 and 132 or a connection method thereof with the internal electrodes 121 and 122 may vary according to exemplary embodiments. Main constituent materials of the internal electrodes 121 and 122 may be Cu, Ni, Ag, Pd, etc., and alloys thereof may also be used.

The external electrodes 131 and 132 are formed outside the body 110 and include first and second external electrodes 131 and 132 connected to the first and second internal electrodes 121 and 122, respectively. The external electrodes 131 and 132 include a first electrode layer 141, a glass layer 142, and a second electrode layer 143. In addition, additional electrode layers 144 and 145 may be disposed on the second electrode layer 143, but the additional electrode layers 144 and 145 may be excluded according to exemplary embodiments.

The first electrode layer 141 covers the first surface S1 of the body 110, and as described above, the first surface S1 corresponds to the surface to which the internal electrodes 121 and 122 are exposed. The first electrode layer 141 may be connected to the internal electrodes 121 and 122 and may be formed of a conductive material such as Cu, Ni, or alloys thereof. The first electrode layer 141 may be formed by transferring, printing, or dipping a conductive paste on the first surface S1 of the body 110. In this exemplary embodiment, it is shown that the first electrode layer 141 is formed only on the first surface S1 of the body 110, but the first electrode layer 141 may also be formed on a second surface S2 of the body 110 perpendicular to a stacking direction (X direction) of the internal electrodes 121 and 122 and on a third surface S3 perpendicular to both the first surface S1 and the second surface S2. The second electrode layer 143 may cover the first electrode layer 141 and the glass layer 142 and may be formed of a conductive material, e.g., Ni, Cu, or alloys thereof. In this case, the second electrode layer 143 may include the same material as the first electrode layer 141. The second electrode layer 143 may be formed by transferring, printing, or dipping a conductive paste to cover the glass layer 142. When the aforementioned method is used, the first and second electrode layers 141 and 143 may be implemented in the form of a sintered electrode obtained by firing a conductive paste.

Figure 4:
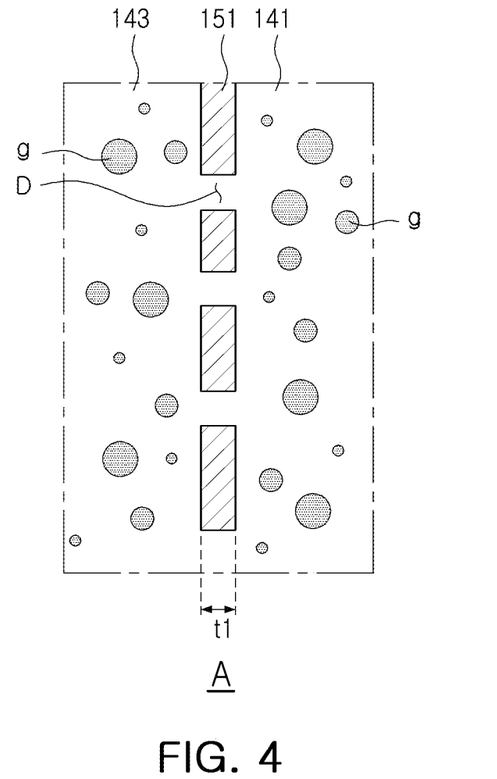
FIGS. 4 through 9 are enlarged views of a partial region of FIG. 2.
Figure 5:
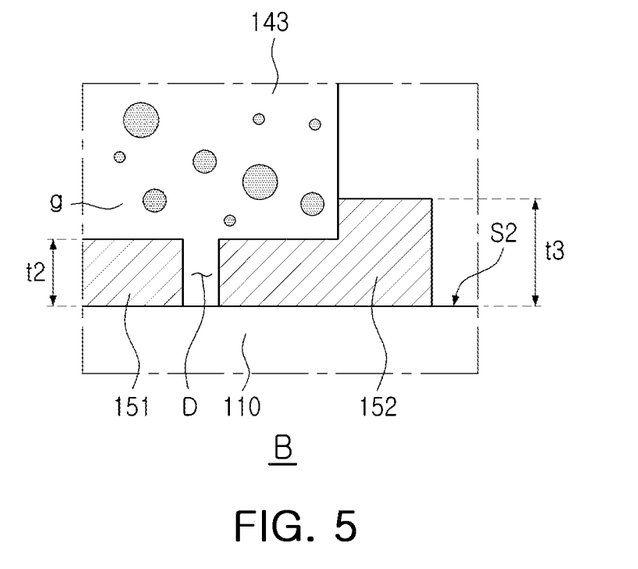
Figure 6:
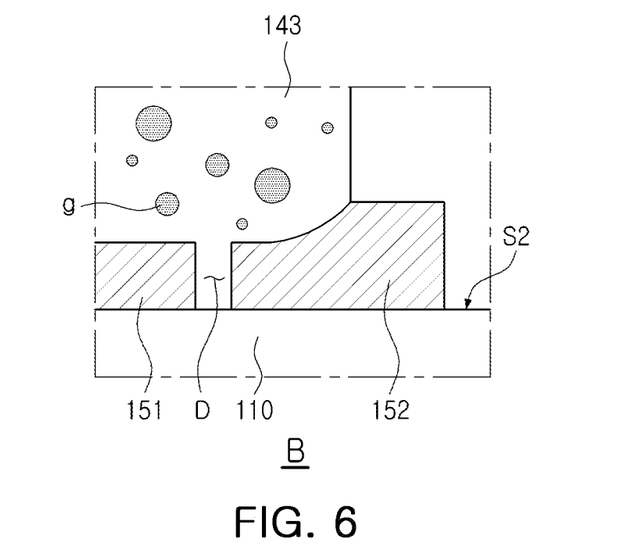

The glass layer 142 may cover the first electrode layer 141 and the second surface S2 of the body 110 and may also cover the third surface S3 of the body 110. As shown in FIGS. 4 and 5, the glass layer 142 includes the inner region 151 having the discontinuous region D and the outer region 152 covering the second surface S2 of the body 110 and having an end exposed from the second electrode layer 143. Here, the end of the outer region 152 may protrude laterally from the second electrode layer 143. For example, a portion of a side surface of an end of the second electrode layer 143 may be covered by the outer region 152. In FIG. 5, other components of the external electrodes 131 and 132 than the glass layer 142 and the second electrode layer 143 are omitted. The glass layer 142 is a component employed to protect a region in which moisture resistance reliability is weak, such as an interface between the external electrodes 131 and 132 and the body 110. To this end, the glass layer 142 may be formed of a material having excellent properties such as reactivity with ceramics, denseness, and plating resistance. For example, Ba—Zn-based glass, Dy—Zr-based glass, etc. may be used, and in addition, glass containing B and Si components may also be used.

Figure 9:
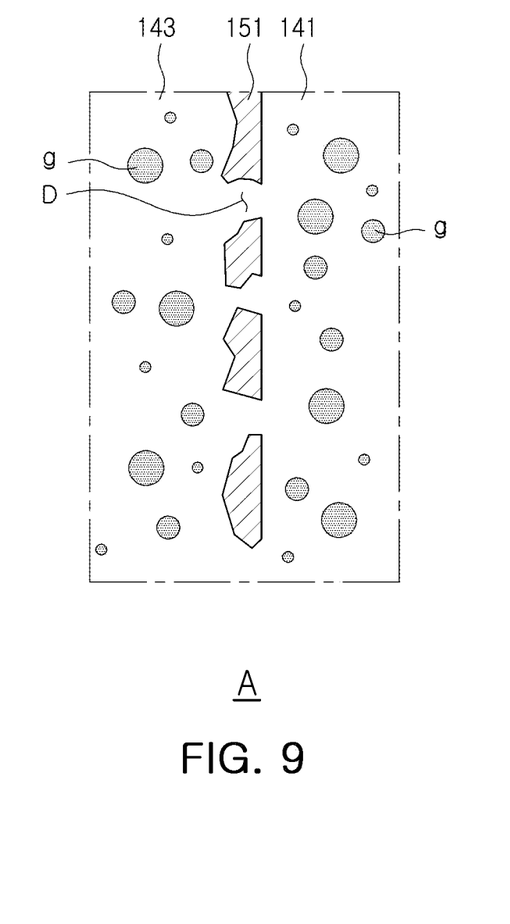

The inner region 151 of the glass layer 142 includes the discontinuous region D, and at least a portion thereof is filled with at least one of the first and second electrode layers 141 and 143, so that the first and second electrode layers 141 and 143 may be connected to each other. An electrical connection path between the first and second electrode layers 141 and 143 may be formed through the discontinuous region D. The discontinuous region D of the glass layer 142 may be formed as glass components are melted and a portion of the glass layer 142 is separated during firing of the first and second electrode layers 141 and 143. Accordingly, as shown in FIG. 9, the glass layer 142 may have a random surface of the inner region 151. The glass layer 142 may be seen to maintain a layer shape as a whole based on a cross-section, and a plurality of regions divided by the discontinuous region D may exist in an island shape. In addition, the first and second electrode layers 141 and 143 may include glass g having the same component as that included in the glass layer 142. As illustrated, a region of the inner region 151 of the glass layer 142 covering the second surface S2 of the body 110 may be in contact with the body 110. In this case, the first electrode layer 141 may not cover the second surface S2 of the body 110.

As described above, the outer region 152 of the glass layer 142 has an end exposed from the second electrode layer 143, thereby effectively blocking penetration of moisture or a plating solution at the interface between the external electrodes 131 and 132 and the body 110. In this case, as illustrated, the outer region 152 may be formed only near the ends of the external electrodes 131 and 132, and accordingly, the outer region 152 may expose a portion of the second surface S2 of the body 110. Similarly, the outer region 152 may expose a portion of the third surface S3 of the body 110. When the outer region 152 of the glass layer 142 covers the second surface S2 or the third surface S3 of the body 110 entirely, the glass component of the glass layer 142 may react with the glass component present in the body 110 to form a secondary phase during firing or a follow-up heat treatment of the external electrodes 131 and 132. This secondary phase may reduce insulation resistance of the body 110, which leads to a decrease in reliability. In the present exemplary embodiment, the glass layer 142 of the first external electrode 131 and the glass layer 142 of the second external electrode 132 are not connected to each other. More specifically, the outer region 152 of the glass layer 142 is not connected. Accordingly, an occurrence of the secondary phase due to a reaction between the body 110 and the glass layer 142 may be reduced.

In this exemplary embodiment, the outer region 152 of the glass layer 142 may be thicker than the inner region 151. That is, in the form shown in FIGS. 4 and 5, a thickness t3 of the outer region 152 may be greater than a thickness t1 or t2 of the inner region 151. This shape may be obtained when more glass components are lost in the inner region 151 than in the outer region 152. In order to sufficiently obtain the protective effect by the glass layer 142, the thickness t3 of the outer region 152 may be 0.5 μm or more and the thickness t1 of the inner region 151 may be 0.2 μm or more. Here, each of thicknesses t1 and t3 may be based on a cross-section perpendicular to the second direction (Y direction) as shown in FIG. 2, and, as an example, a cross-section of a middle region of the body 110 in the second direction (Y direction) may be selected. Also, as in a modification of FIG. 6, a thickness may gradually change at a connection portion between the inner region 151 and the outer region 152. Specifically, a portion of the inner region 151 of the glass layer 142 may decrease in thickness in an inward direction (left side in FIG. 6) from a region connected to the outer region 152. Meanwhile, when considering that the glass layer 142 has a random shape, a thickness of the glass layer 142 may be defined as a maximum thickness in the corresponding region. In one example, a thickness of an element may mean a dimension of the element in a direction perpendicular to a surface of the body 110 on which the element is disposed. The thickness of the element may be one of an average thickness, a maximum thickness, and a thickness of the element measured in a measured region, unless contradictory to another definition explicitly described. In one example, the thickness of the element may be determined by defining a predetermined number (e.g., 5) of points to the left and the predetermined number (e.g., 5) of points to the right from a reference center point of the element at equal intervals (or non-equal intervals, alternatively), measuring a thickness of each of the points at equal intervals (or non-equal intervals, alternatively), and obtaining an average value therefrom. Alternatively, the thickness may be the maximum thickness of the multiple measurements. Alternatively, the thickness may be a thickness of the reference center point in the measured region. In one example, an optical microscope or a scanning electron microscope (SEM) may be used in the measurement, although the present disclosure is not limited thereto. Other methods and/or tools appreciated by one of ordinary skill in the art, even if not described in the present disclosure, may also be used.

In addition, the thickness t2 of the region covering the second surface S2 of the body 110 in the inner region 151 of the glass layer 142 may be larger than the thickness t1 of the region covering the first surface S1 of the body 110. This shape may be obtained when the glass component of the glass layer 142 is lost relatively less in the region covering the second surface S2 of the body 110.

Figure 7:
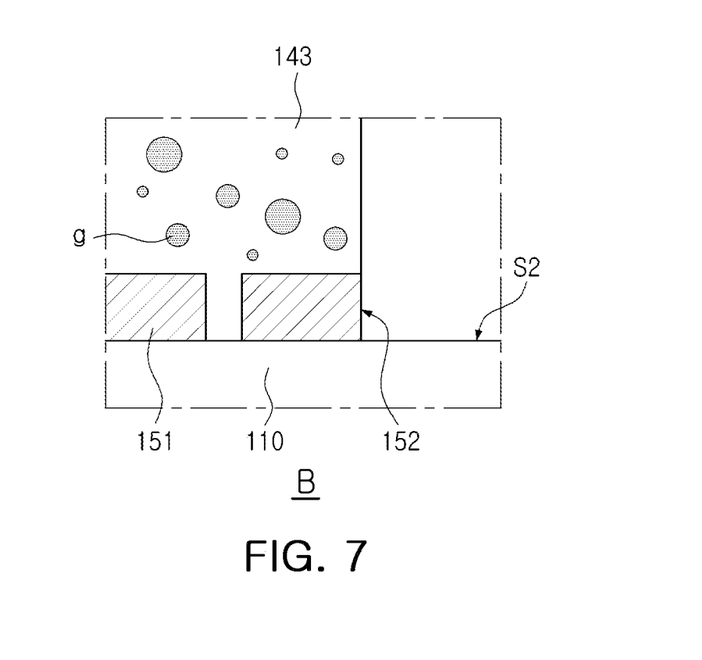
Figure 8:
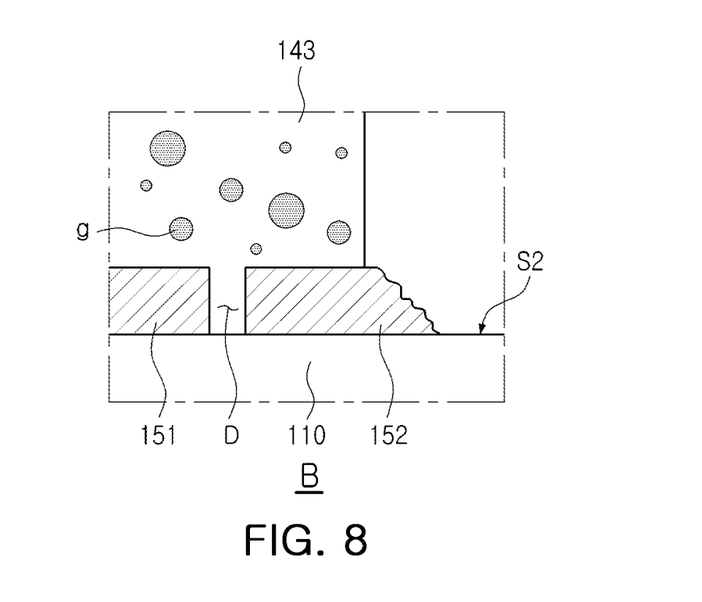

FIGS. 7 and 8 show a modification of the glass layer 142. First, in the case of the exemplary embodiment of FIG. 7, the outer region 152 of the glass layer 142 does not protrude laterally from the second electrode layer 143. That is, only the outermost side surface of the glass layer 142 may be exposed from the second electrode layer 143 to form the outer region 152. In the case of the exemplary embodiment of FIG. 8, the outer region 152 of the glass layer 142 has a random shape and a thickness thereof may decrease in a direction away from the second electrode layer 143. This shape of the glass layer 142 may be obtained when the glass layer 142 having fluidity is cured in a state of being spread outward during firing of the external electrodes 131 and 132.

The other remaining components of the external electrodes 131 and 132 will be described with reference back to FIG. 2. The external electrodes 131 and 132 may include additional electrode layers 144 and 145 covering the second electrode layer 143. The additional electrode layers 144 and 145 may include a conductive resin electrode 144 and a plating layer 145. The conductive resin electrode 144 may be in a form in which a conductive material and a resin are mixed, but may be excluded depending on an exemplary embodiment. In this case, the conductive resin electrode 144 may be in direct contact with the second electrode layer 143. The plating layer 145 may be implemented in a multilayer structure including Ni, Sn, etc., and as described above, when the plating layer 145 is formed, the glass layer 142 may effectively block penetration of a plating solution into the body 110.

As set forth above, according to exemplary embodiments of the present disclosure, the multilayer capacitor may have improved moisture resistance reliability.

While exemplary embodiments have been shown and described above, it will be apparent to those skilled in the art that modifications and variations could be made without departing from the scope of the present disclosure as defined by the appended claims.

What is claimed is:
1. A multilayer capacitor comprising:
    a body including a stack structure in which dielectric layers are stacked and first and second internal elec- trodes are stacked with one of the dielectric layers interposed therebetween; and first and second external electrodes disposed on the body and connected to the first and second internal electrodes, respectively, wherein the first external electrode includes a first electrode layer covering a first surface of the body to which the first internal electrode is exposed, a glass layer covering the first electrode layer and a second surface of the body connected to the first surface, and a second electrode layer covering the glass layer, and the glass layer includes an inner region having a discontinuous region and an outer region covering the second surface of the body and having an end exposed from the second electrode layer, wherein at least a portion of the discontinuous region is filled with at least one of the first and second electrode layers so that the first and second electrode layers are connected to each other.

2. The multilayer capacitor of claim 1, wherein the outer region is thicker than the inner region.

3. The multilayer capacitor of claim 1, wherein the first and second electrode layers include the same material.

4. The multilayer capacitor of claim 1, wherein the first and second electrode layers include at least one of Cu and Ni.

5. The multilayer capacitor of claim 1, wherein the first and second electrode layers include glass having the same component as that included in the glass layer.

6. The multilayer capacitor of claim 1, wherein the outer region exposes a portion of the second surface.

7. The multilayer capacitor of claim 1, wherein the outer region of the glass layer included in the first external electrode and an outer region of a glass layer included in the second external electrode are spaced apart from each other.

8. The multilayer capacitor of claim 1, wherein a region of the inner region of the glass layer covering the second surface of the body is thicker than a region covering the first surface of the body.

9. The multilayer capacitor of claim 1, wherein a thickness of the outer region of the glass layer is 0.5 µm or more.

10. The multilayer capacitor of claim 1, wherein a thickness of the inner region of the glass layer is 0.2 µm or more.

11. The multilayer capacitor of claim 1, wherein a region of the inner region of the glass layer covering the second surface of the body is in contact with the body.

12. The multilayer capacitor of claim 1, wherein the first electrode layer does not cover the second surface of the body.

13. The multilayer capacitor of claim 1, wherein a portion of the inner region decreases in thickness in an inward direction from a region connected to the outer region.

14. The multilayer capacitor of claim 1, wherein a surface of the inner region has a random shape.

15. The multilayer capacitor of claim 1, wherein a surface of the outer region has a random shape.

16. The multilayer capacitor of claim 1, wherein the second surface of the body is perpendicular to a direction in which the first and second internal electrodes are stacked.

17. The multilayer capacitor of claim 1, wherein a portion of a side surface of an end of the second electrode layer is covered by the outer region.

18. The multilayer capacitor of claim 1, wherein the first external electrode further includes a plating layer, and the outer region covering the second surface of the body has the end exposed from the plating layer.

19. A multilayer capacitor comprising:

a body including a stack structure in which dielectric layers are stacked and first and second internal electrodes are stacked with one of the dielectric layers interposed therebetween; and first and second external electrodes disposed on the body and connected to the first and second internal electrodes, respectively, wherein the first external electrode includes a first electrode layer covering a first surface of the body to which the first internal electrode is exposed, a glass layer covering the first electrode layer and a second surface of the body connected to the first surface, and a second electrode layer covering the glass layer, and the glass layer includes an inner region having a discontinuous region and an outer region covering the second surface of the body and having an end exposed from the second electrode layer, wherein a region of the inner region of the glass layer covering the second surface of the body is in contact with the body.

20. A multilayer capacitor comprising:

a body including a stack structure in which dielectric layers are stacked and first and second internal electrodes are stacked with one of the dielectric layers interposed therebetween; and first and second external electrodes disposed on the body and connected to the first and second internal electrodes, respectively, wherein the first external electrode includes a first electrode layer covering a first surface of the body to which the first internal electrode is exposed, a glass layer covering the first electrode layer and a second surface of the body connected to the first surface, and a second electrode layer covering the glass layer, and the glass layer includes an inner region having a discontinuous region and an outer region covering the second surface of the body and having an end exposed from the second electrode layer, wherein a portion of a side surface of an end of the second electrode layer is covered by the outer region.

* * * * *